(12) United States Patent  
Vasudevan et al.

(10) Patent No.: US 9,313,141 B2
(45) Date of Patent: Apr. 12, 2016

(54) TRANSMIT SCALING USING MULTIPLE QUEUES

(71) Applicant: Intel Corporation, Santa Clara, CA (US)

(72) Inventors: Anil Vasudevan, Portland, OR (US); Sujoy Sen, Portland, OR (US); Partha Sarangam, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/771,839

(22) Filed: Feb. 20, 2013

(65) Prior Publication Data

US 2013/0227161 A1 Aug. 29, 2013

Related U.S. Application Data

(63) Continuation of application No. 13/168,403, filed on Jun. 24, 2011, now Pat. No. 8,386,626, and a continuation of application No. 11/964,786, filed on Dec. 27, 2007, now Pat. No. 7,979,507.

(51) Int. Cl.
| | |
|---|---|
| G06F 15/16 | (2006.01) |
| H04L 12/863 | (2013.01) |
| H04L 12/859 | (2013.01) |
| H04L 12/861 | (2013.01) |
| H04L 29/06 | (2006.01) |
| H04L 12/28 | (2006.01) |
| H04L 29/08 | (2006.01) |

(52) U.S. Cl.
CPC .......... *H04L 47/622* (2013.01); *H04L 47/2475* (2013.01); *H04L 49/90* (2013.01); *H04L 49/9047* (2013.01); *H04L 49/9063* (2013.01); *H04L 49/9094* (2013.01); *H04L 69/12* (2013.01); *H04L 69/32* (2013.01)

(58) Field of Classification Search
USPC ....................................................... 709/232
See application file for complete search history.

(56) References Cited

U.S. PATENT DOCUMENTS

| | | | |
|---|---|---|---|
| 2006/0067349 A1* | 3/2006 | Ronciak et al. | 370/412 |
| 2007/0174511 A1 | 7/2007 | Yu et al. | |
| 2008/0005296 A1 | 1/2008 | Lee et al. | |
| 2009/0172178 A1 | 7/2009 | Vasudevan et al. | |
| 2010/0049876 A1* | 2/2010 | Pope et al. | 709/250 |
| 2012/0054305 A1 | 3/2012 | Vasudevan et al. | |
| 2013/0117621 A1* | 5/2013 | Saraiya et al. | 714/748 |
| 2013/0136134 A1* | 5/2013 | Chao et al. | 370/392 |

* cited by examiner

*Primary Examiner* — Chris Parry
*Assistant Examiner* — Alan S Chou
(74) *Attorney, Agent, or Firm* — Alpine Technology Law Group LLC

(57) ABSTRACT

In general, in one aspect, computer program instructions are to cause, when executed, at least one processor to determine a transmit queue from many transmit queues to associate with a connection, store an identifier of the transmit queue in a connection socket structure associated with the connection, and access the identifier of the transmit queue from a connection socket structure associated with a connection of an egress packet.

13 Claims, 6 Drawing Sheets

TRANSMIT SCALING USING MULTIPLE QUEUES

This application is a continuation of and claims priority to application Ser. No. 13/168,403, now U.S. Pat. No. 8,386,626, filed Jun. 24, 2011 and application Ser. No. 13/964,786, now U.S. Pat. No. 7,979,507, filed Dec. 27, 2007.

BACKGROUND

A communication network may facilitate an exchange of information between network devices. For example, a personal computer connected to a network might transmit data to another personal computer that is also connected to the network. Some networks transmit data in the form of packets created and processed in accordance with a protocol. Moreover, with some protocols it may be important to maintain the order of information being exchanged (e.g., a series of packets might need to be transmitted and/or received in a particular order). Also note that some network devices include multiple processing elements, and an operating system might dynamically schedule multiple threads (e.g., associated with various application and/or network connections) to be executed on the processing elements.

As networks physically support increased data transmission speeds, more efficient packet processing methods and systems may become desirable. For example, it might be advantageous to support an efficient transmission of in-order data from a network device, even when the device is able to execute different threads and/or applications using different processing elements and/or network connections.

DETAILED DESCRIPTION

Figure 1:
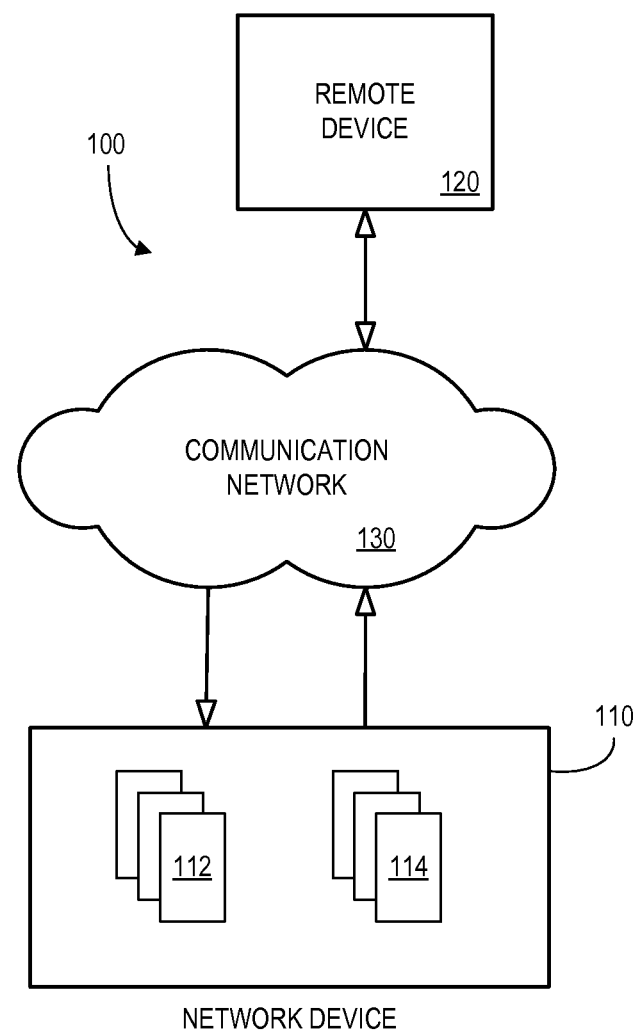
FIG. 1 is a block diagram of a system according to some embodiments.

FIG. 1 is a block diagram of a system 100 according to some embodiments wherein a network device 110 exchanges information with a remote device 120 via a communication network 130. As used herein, the term "network" may refer to, for example, a network associated with the Fast Ethernet LAN transmission standard 802.3-2002® published by the Institute of Electrical and Electronics Engineers (IEEE). Moreover, some embodiments are associated with "packets" of information. As used herein, the term "packet" may refer to, for example, an Transmission Control Protocol (TCP) Internet Protocol (IP) information packet.

The network device 110 might be associated with, for example, a personal computer, a personal digital assistant, a wireless telephone, a network interface card, or a network switch or router. The network device 110 may, for example, receive streams of data from the remote device 120, such as a remote personal computer or handheld device, process the data, and forward the data to other devices, including network switches or routers. The data may be received and forwarded by several network devices until they reach an appropriate destination.

The communication network 130 may comprise one or more network types, including but not limited to a Local Area Network (LAN), a Metropolitan Area Network (MAN), a Wide Area Network (WAN), a Fast Ethernet network, a wireless network, a fiber network, and/or an IP network, such as the Internet, an intranet, or an extranet. The communication network 130 may support Layer 2 protocols, such as Ethernet or Packet-Over SONET, in which data is transmitted in packet form.

The network device 110 may receive information through the communication network 130 using a plurality of receive queues 112. In this way, the workload associated with incoming data might be balanced among multiple processing elements of the network device 110.

According to some embodiments, the network device 110 may transmit information through the communication network 130 using a plurality of transmit queues 114. Note, however, that in some cases there may be a need to maintain the order of data being sent by an application (e.g., an application associated with a stream oriented protocol such as TCP). That is, if the network device 110 were to place data into different transmit queues 114, and then service those queues 114 in a different order, undesirable results may occur (e.g., when the remote device 120 observes the packets out-of-order).

To avoid such a result, a single transmit queue 114 might be assigned to each processing element and/or application executing at the network device 110. Such an approach may not scale as the abilities of the network device 110 are increased. Moreover, it may limit the flexibility of an operating system to efficiently schedule threads being executed by the network device.

According to some embodiments, it may be determined at a first processing element of the network device 110, that first data is to be transmitted in association with a first network connection. The first network connection might be associated with, for example, a particular Transport Control Block (TCB) connection. A first entry associated with the first data may then be stored into a first transmit queue 114. It may subsequently be determined, at a second processing element of the network device 110, that second data is to be transmitted in association with the same first network connection. For example, execution of a particular application thread might have been moved from the first to the second processing element. A second entry associated with the second data may then be stored into a second transmit queue 114 (different than the first transmit queue).

It may then be arranged for the data to be transmitted from the network device 110 based on information in the transmit queues 114 and associated synchronization descriptors. For example, a synchronization descriptor might include an identifier associated the first processing element, the first application thread, and/or a transmit queue 114. Moreover, as will be described herein, the synchronization descriptor might include an identifier associated with a processing element that previously executed the first application thread, a descriptor index associated with a prior transmit operation from the first application thread, and/or a sequence number associated with the prior transmit operation. Note that a descriptor might include additional information, such as a command type (including any encryption, transformation, or other special requirements associated with the transmit command) and/or a data buffer address and buffer length that identifies the actual data to be transmitted.

Figure 2:
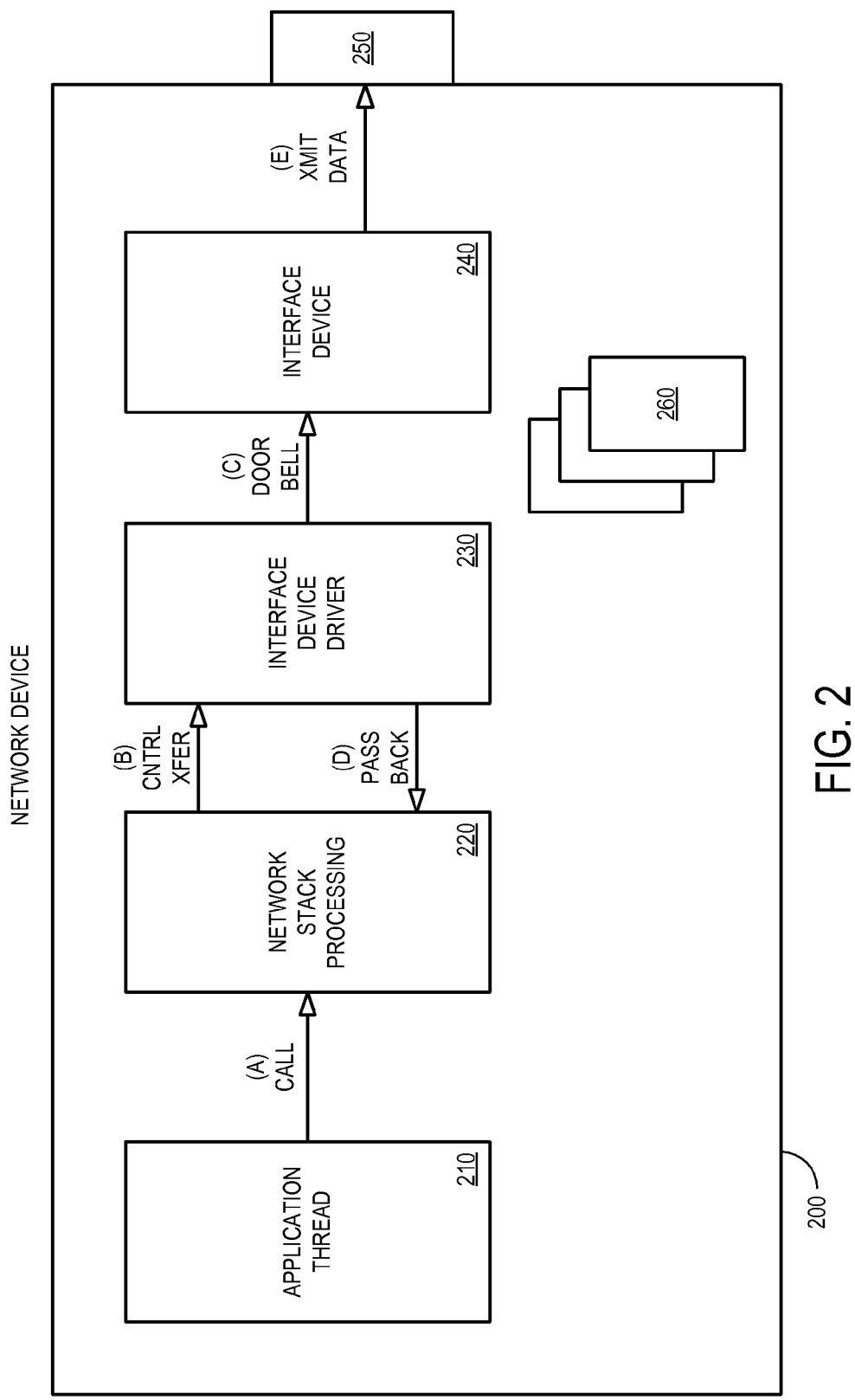
FIG. 2 is a block diagram of a network device according to some embodiments.

FIG. 2 is a block diagram of a network device 200 according to some embodiments. By way of example, the network device 200 might be associated with an IXP2400™ or an IXP2800™ network processor. The network device 200 may include a plurality of processing elements, such as execution cores, and an operating system may dynamically arrange for threads 210 associated with various applications to be executed by these processing elements.

The network device 200 may further include a network stack processing infrastructure 220, an interface device driver 230, and an interface device 240 to transmit data through a communication port 250. Moreover, according to some embodiments, a plurality of transmit queues 260 may be used to facilitate the transmission of data from the network device 200.

By way of example, the number of transmit queues 260 might equal the number of execution cores available to the network device 200. Moreover, queues 0 through N might be mapped one-to-one with execution cores 0 through N (e.g., a process executing on core 3 might use transmit queue 3 to communicate). Now consider an application thread 210 executing on core 0 that transmits data block 0 using transmit queue 0. Subsequently, the application thread 210 gets scheduled on core 1 and transmits data block 1 using transmit queue 1 for the same connection. In this case, it may be undesirable to have the network device 200 process transmit queue 1 first and thus transmit data block 1 before data block 0.

To avoid such a result, some embodiments may explicit synchronization mechanisms in connection with processing of the transmit queues 260 by the network device 200. For example, descriptors may be associated with data being transmitted and might include: (i) information about which core and/or queue a thread is running on (e.g., and may be used by the network device 200 to synchronize processing), (ii) which core and/or queue a thread last ran on (e.g., to help determine which queue was used for a previous transmit operation), (iii) a descriptor index used to signal a prior transmit operation (e.g., to directly index into a descriptor that should have been processed prior to one currently being processed), and/or (iv) a sequence number of the prior transmit operation completed by the application.

By way of example, the application thread 210 may determine that information is to be transmitted from the network device 200 and, at (A) issue a send call that initiates a transmit operation. This may cause a transition to kernel mode and network stack processing 220 may begin as a result of the send call. The network stack processing 220 may create appropriate headers and payloads associated with the data to be transmitted and transfer control at (B) to the interface device driver 230. As part of this control transfer, the network stack processing 220 may also provide to the interface device driver: (i) a sequence number of the prior transmit operation completed by the application, and (ii) opaque information that was previously passed back from the interface device driver 220.

The interface device driver 230 may then identify an execution core it is running on (as well as a transmit queue 260 associated with that core). In some cases, core n might be associated with transmit queue n (e.g., to reduce locks associated with the transmit queues 260). Note, however, that multiple execution cores might be mapped to a single transmit queue 260. The interface device driver 230 may also create a descriptor and fill in information received from the network stack at (B).

According to some embodiments, the interface device driver 230 calculates a next available index in the transmit queue 260 to insert a descriptor. This information may be added to an opaque data structure ("opaque" from the perspective of the layers above the interface device driver 230). The opaque data structure may, for example, contain state information used by the interface device driver 230 that it passes on to the interface device 240 (e.g., the index and transmit queue number). The interface device driver 230 then at (C) rings a doorbell on the interface device 240 (e.g., via a write to a device register) causing the interface device 240 to wake up. In addition, the interface device driver 230 may at (D) pass back the filled opaque data structure to the network stack processing 220. According to some embodiments, the opaque data structure is saved inside an application-specific communication context, such as a socket structure or TCB structure (and the data can subsequently be provided back to the interface device driver 230 in connection with the next outbound data transfer).

The interface device 240 (e.g., associated with a network interface card) may wake up when the doorbell is rung at (C) and begin to pull data from the specific transmit queue 260 signaled by the doorbell. When the interface device 240 parses a descriptor, it may look for a queue number of the last operation. If the queue number is the same as the one signaled by the doorbell, the thread may continue to work on the same queue and the appropriate data is eventually transmitted in-order at (E) from the network device 200.

If the queue number is not the same, it may be determined if the index in the queue of the last operation points to a descriptor that has not yet been processed by the interface device 240. If it has not yet been processed, the interface device 240 may arrange for the descriptor corresponding to that index to be processed first (that is, before the newly submitted one). If it has already been processed, the interface device 240 may instead proceed with operations on the newly submitted descriptor.

Figure 3:
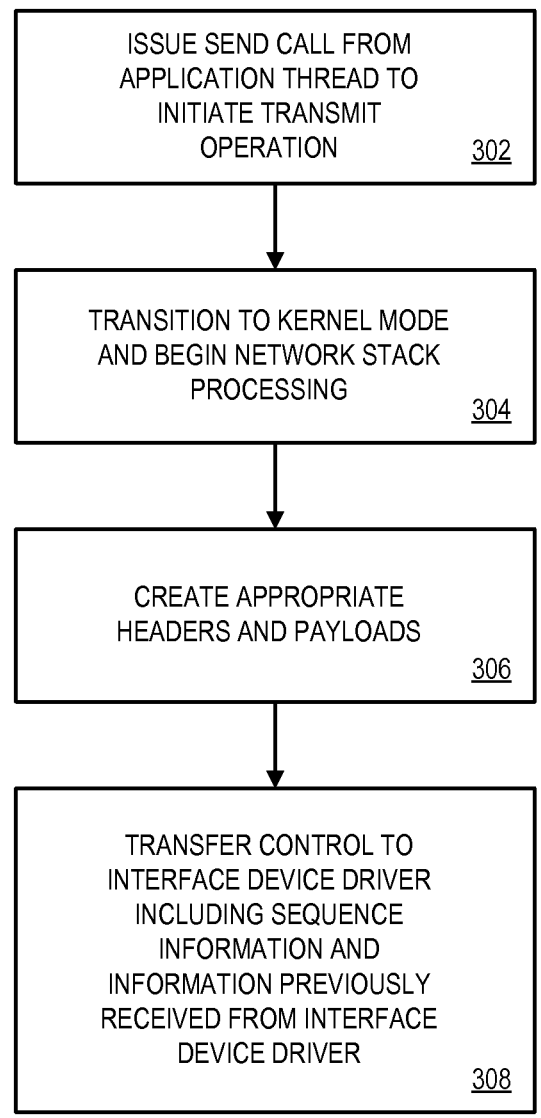
FIG. 3 is a flow chart of a method that may be associated with an application thread and/or a network stack according to some embodiments.

FIG. 3 is a flow chart of a method that may be associated with an application thread and/or a network stack according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a hardware instruction mapping engine might be used to facilitate operation according to any of the embodiments described herein. The method of FIG. 3 may be associated with, for example, the application threads 210 and/or the network stack processing 220 described with respect to FIG. 2.

At 302, a first application thread 210 executing on a first processing element may issue an indication that data is to be transmitted (e.g., using a send call). The data to be transmitted may be associated with, for example, a stream oriented protocol and/or Transport Control Protocol information.

At 304, the indication may result in a transition to kernel mode and the initiation of network stack processing 220. At 306, appropriate headers and payloads may be created (e.g., by the network stack processing 220) for the data to be transmitted.

At 308, control may be transferred to the interface device driver 230. For example, the following might be provided from the network stack processing 220 to the interface device driver: (i) a sequence identifier associated with a prior transmit operation for the first application thread, and (ii) synchronization information previously received from the interface device driver 230 via an opaque data structure. The opaque data structure may be, for example, associated with an application specific communication context, a socket structure, and/or a TCB structure.

Figure 4:
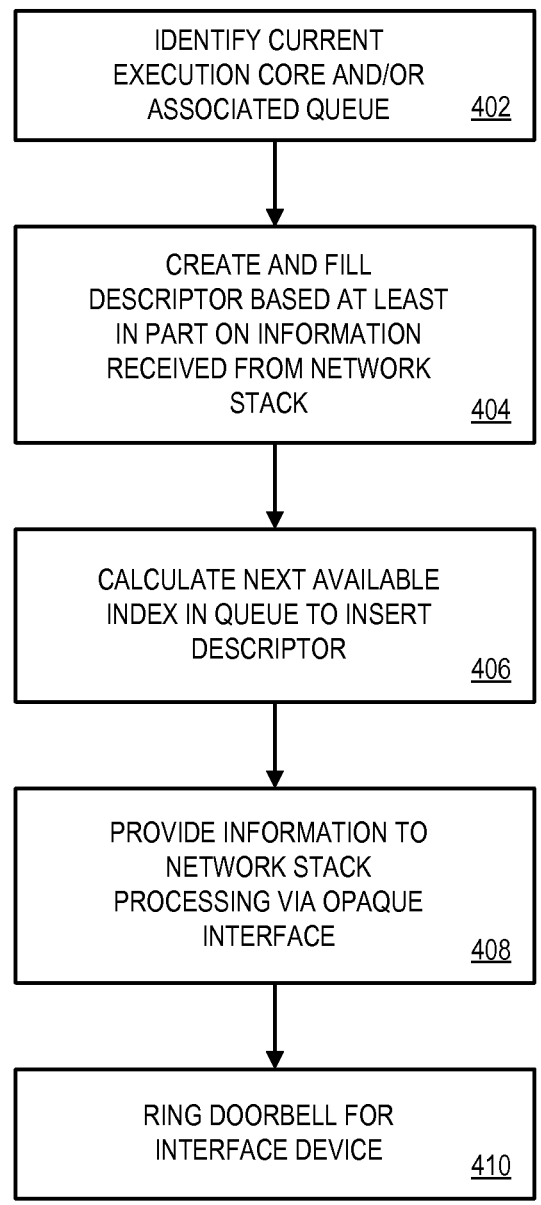
FIG. 4 is a flow chart of a method that may be associated with an interface device driver according to some embodiments.

FIG. 4 is a flow chart of a method that may be associated with the interface device driver 230 of FIG. 2 according to some embodiments. At 402, a first processing element and a first transmit queue (of a plurality of transmit queues) may be identified at the interface device driver 230. A first descriptor, including information received from a network stack portion, may then be created by the interface device driver 230 at 404.

At 406, a next available index in the first transmit queue (where the first descriptor is to be inserted) may be calculated at the interface device driver 230. An indication of the next available index may then be provided at 408 from the interface device driver 230 to the network stack portion 220 via an opaque data interface or structure.

At 410, a transmit initiation indication (including an identifier of the first transmit queue) may be provided from the interface device driver 230 to an interface device 240 (e.g., a network interface card). The transmit initiation information might be, for example, be associated with a doorbell ringing operation and/or a Memory-Mapped Input Output (MMIO) write to a device register.

Figure 5:
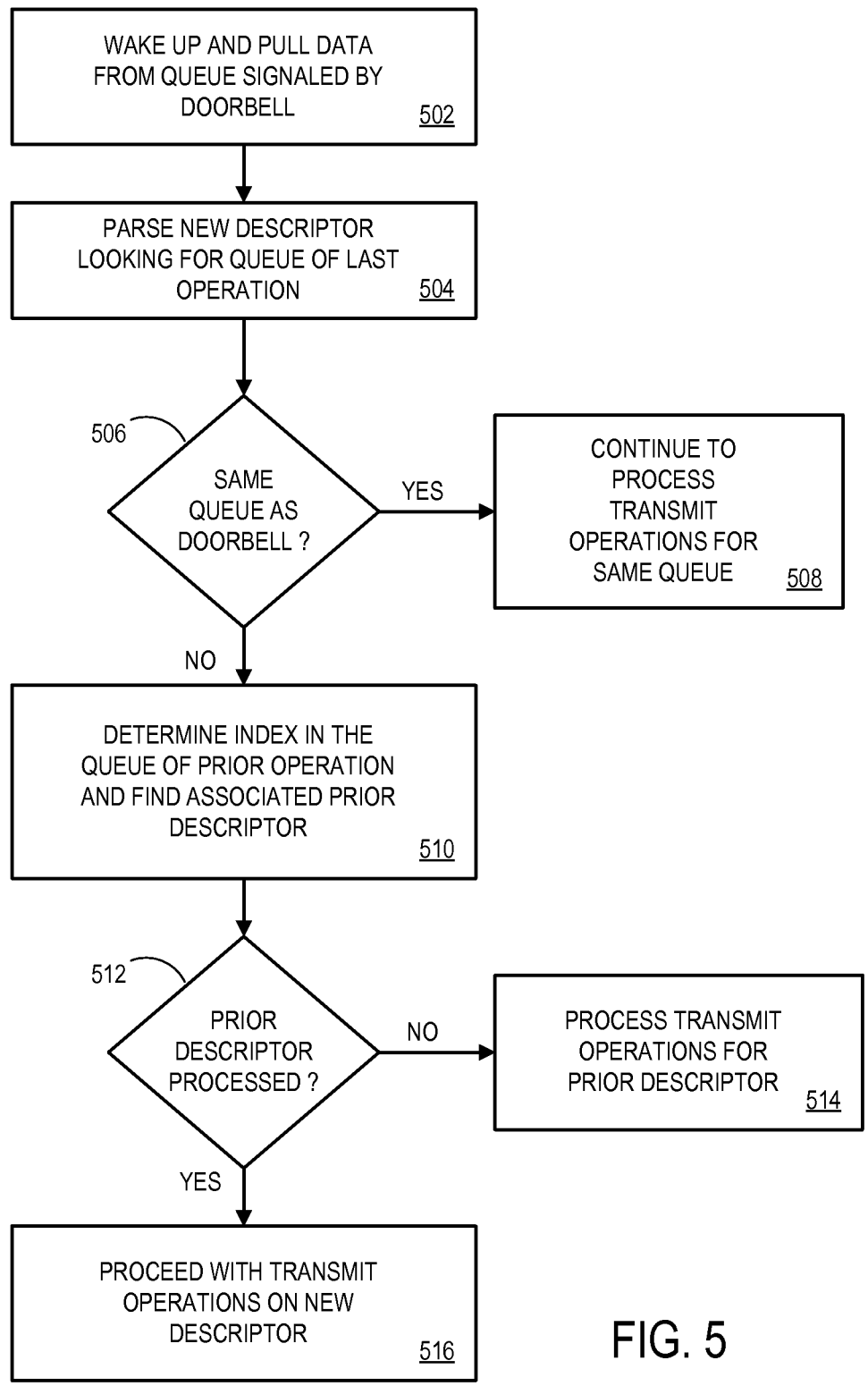
FIG. 5 is a flow chart of a method that may be associated with an interface device according to some embodiments.

FIG. 5 is a flow chart of a method that may be associated with the interface device 240 of FIG. 2 (e.g., a network interface card) according to some embodiments. At 502, the interface device 240 may wake up and begin pulling data from the first transmit queue identified by the transmit initiation indication (e.g., as signaled by the doorbell that was rung at 410 of FIG. 4). The new descriptor may then be parsed by the interface device 240 to determine the transmit queue 260 of the last transmit operation.

The transmit queue of the last operation may then be compared at 506 with the first transmit queue. If the transmit queue of the last operation is the same as the first transmit queue, the interface device 240 may proceed to process transmit operations for the first transmit queue at 508. If the transmit queue of the last operation is not the same as the first transmit queue at 506, the interface device 240 may determine at 510 an index in the transmit queue 260 of the prior operation along with an associated prior descriptor.

If the index in the transmit queue of the last operation points to a prior descriptor that has not yet been processed at 512, the prior descriptor may be processed at 514 by the interface device 240. If the index in the transmit queue of the last operation points to a prior descriptor that has already been processed, the new (current) descriptor may be processed at 516 by the interface device 240.

Thus, some embodiments described herein may scale performance of outbound data transfers from a network device significantly. Moreover, multiple transmit queues may be targeted simultaneously to send data without needing to pin threads to particular cores. As a result, network Input Output (IO) performance may be improved as the number of cores on a platform is increased. That is, an architecture that permits for the fanning out of outbound transmit data flows, while maintaining in-order data transfers, may be provided.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Figure 6:
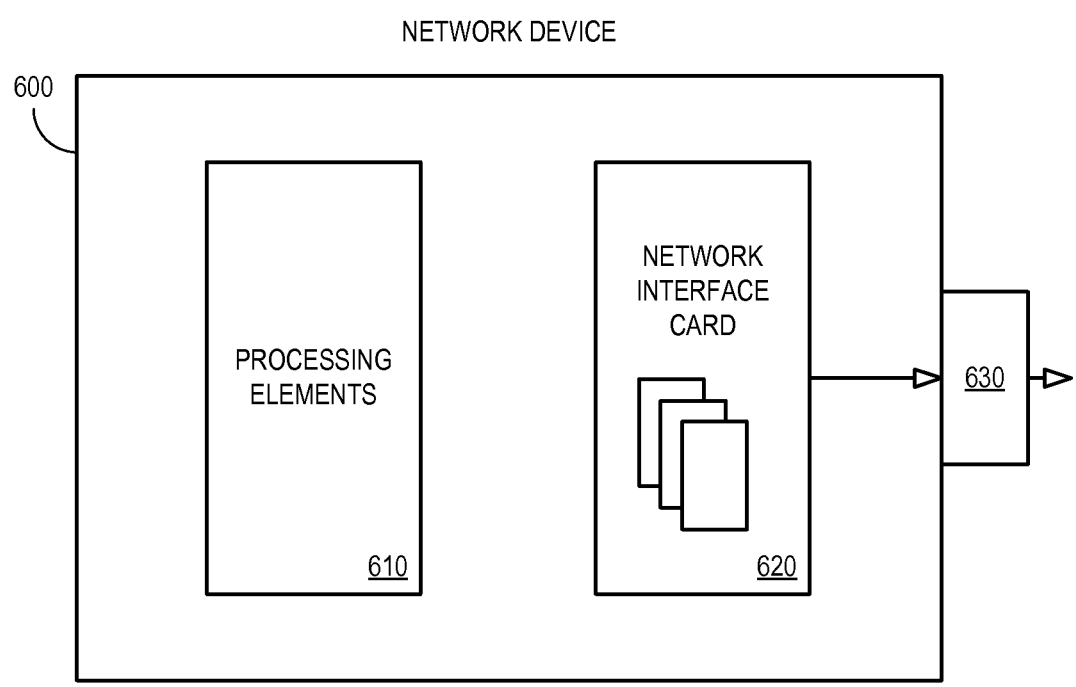
FIG. 6 is a block diagram of a system according to some embodiments.

For example, although some embodiments have been described with respect to the network devices 110, 200 of FIGS. 1 and 2, embodiments may be associated with any other type of network device or system. For example, FIG. 6 is a block diagram of a system 600 according to some embodiments. In particular, the system 600 includes a plurality of processing elements 610 (e.g., on a motherboard) to execute application threads, wherein a first application thread executing at a first processing element may determine that data is to be transmitted through a network communication port 630 to a remote device. The system 600 further includes a network interface card 620 adapted to access a plurality of transmit queues 620 to facilitate the transmission of the data, wherein a single transmit queue is to simultaneously store information associated with more than one network connection. Moreover, entries for a single network connection may be stored across multiple transmit queues 620.

The several embodiments described herein are solely for the purpose of illustration. Persons skilled in the art will recognize from this description other embodiments may be practiced with modifications and alterations limited only by the claims.

What is claimed is:

1. Computer program instructions, disposed on a non transitory computer readable medium, to cause, when executed, at least one processor element to:
   determine a first transmit queue among a plurality of transmit queues to associate with a connection;
   store an identifier of the first transmit queue in a connection socket structure associated with the connection;
   access the identifier of the first transmit queue from the connection socket structure associated with the connection for a first egress packet, transmission of the first egress packet initiated by a first processor element and to be transmitted via the first transmit queue;
   prevent out-of-order transmission of a second egress packet within the connection due to a change in the association of the connection from the first transmit queue to a second transmit queue among the plurality of transmit queues and based on an uncompleted transmission of the first egress packet via the first transmit queue, the second egress packet initiated by a second processor element and to be transmitted via a second transmit queue; and
   change the association of the connection from the first transmit queue to the second transmit queue.

2. The computer program instructions of claim 1, further comprising instructions to cause, when executed, the at least one processor element to:
   determine a processor element initiating transmission of the first egress packet.

3. The computer program instructions of claim 1, wherein the socket comprises a TCP/IP (Transmission Control Protocol/Internet Protocol) socket.

4. The computer program instructions of claim 1, further comprising instructions to cause, when executed, the at least one processor element to:
   change the identifier of the first transmit queue stored in the socket structure to an identifier of the second transmit queue.

5. The computer program instructions of claim 4, further comprising instructions to cause, when executed, the at least one processor element to:
   compare the identifier of the second transmit queue with the identifier of the first transmit queue.

6. The computer program of claim 1, further comprising instructions to cause, when executed, the at least one processor element to:

store an entry for the first egress packet in the first transmit queue.

7. A system, comprising:

multiple processor elements;

at least one network interface; and computer program instructions, disposed on a computer readable medium, to cause, when executed, at least one of the multiple processor elements to:

determine a first transmit queue among a plurality of transmit queues to associate with a connection;

store an identifier of the first transmit queue in a connection socket structure associated with the connection;

access the identifier of the first transmit queue from the connection socket structure associated with the connection for a first egress packet, transmission of the first egress packet initiated by a first processor element and to be transmitted via the first transmit queue;

prevent out-of-order transmission of a second egress packet within the connection due to a change in the association of the connection from the first transmit queue to a second transmit queue among the plurality of transmit queues and based on an uncompleted transmission of the first egress packet via the first transmit queue, the second egress packet initiated by a second processor element and to be transmitted via a second transmit queue; and change the association of the connection from the first transmit queue to the second transmit queue.

8. The system of claim 7, further comprising instructions to cause, when executed, the at least one of the multiple processor elements to:

determine a processor element initiating transmission of the first egress packet.

9. The system of claim 7, wherein socket comprises a TCP/IP (Transmission Control Protocol/Internet Protocol) socket.

10. The system of claim 7, further comprising instructions to cause, when executed, the at least one of the multiple processor elements to:

change the identifier of the first transmit queue stored in the socket structure to an identifier of the second transmit queue.

11. The system of claim 10, further comprising instructions to cause, when executed, the at least one of the multiple processor elements to:

compare the identifier of the second transmit queue with the identifier of the first transmit queue.

12. The system of claim 7, wherein a one of the transmit queues services different ones of the multiple processor elements.

13. The system of claim 7, further comprising instructions to cause, when executed, the at least one of the multiple processor elements to:

store an entry for the first egress packet in the first transmit.

* * * * *